United States Patent
Cain (10) Patent No.: US 7,242,409 B2
(45) Date of Patent: Jul. 10, 2007

(54) INTERPOLATED COLOR TRANSFORM FOR CHANGING COLOR OF AN APPLICATION USER INTERFACE

(75) Inventor: Jonathan Marshall Cain, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 11/101,748

(22) Filed: Apr. 8, 2005

(65) Prior Publication Data

US 2006/0227149 A1 Oct. 12, 2006

(51) Int. Cl.
*G09G 5/02* (2006.01)
*H04N 5/57* (2006.01)
*H04N 1/46* (2006.01)
*G03F 3/08* (2006.01)
*G09G 5/00* (2006.01)
*H04N 9/64* (2006.01)
*H04N 3/27* (2006.01)

(52) U.S. Cl. ............... 345/594; 345/589; 345/591; 345/600; 345/606; 348/577; 348/603; 358/518; 358/520; 358/515; 382/162; 382/167

(58) Field of Classification Search ........ 345/426–428, 345/581, 589–594, 597–606; 348/557–560, 348/577, 603, 645, 649, 660; 358/515–520; 382/162–167
See application file for complete search history.

(56) References Cited

U.S. PATENT DOCUMENTS

| 5,450,217 | A | * | 9/1995 | Eschbach et al. | ........... 358/518 |
| 5,867,169 | A | * | 2/1999 | Prater | ........... 345/604 |
| 6,236,750 | B1 | | 5/2001 | Garber | |

* cited by examiner

Primary Examiner—Wesner Sajous
(74) Attorney, Agent, or Firm—Senniger Powers (57) ABSTRACT

A system and method for adjusting the color of an application user interface (UI). A UI allows a user to define hue and saturation values used to adjust first RGB values of pixels determining the color of the UI. A media player application (MPA) calculates second RGB values as a function of the first RGB values and the defined hue and saturation values. The MPA compares the defined saturation value to a threshold saturation value. If the defined saturation value is less than the threshold saturation value, the MPA calculates third RGB values as a function of the second RGB values, and assigns the third RGB values to the pixels determining the color of the UI. If the defined saturation value is equal to or greater than the threshold saturation value, the MPA assigns the second RGB values to the pixels determining the color of the UI.

20 Claims, 8 Drawing Sheets

FIGURE 1

PRIOR ART

INTERPOLATED COLOR TRANSFORM FOR CHANGING COLOR OF AN APPLICATION USER INTERFACE

TECHNICAL FIELD

The present invention relates to the field of digital imaging. In particular, the invention relates to enhancing contrast between pixel elements rendering an application user interface.

BACKGROUND OF THE INVENTION

In general, most video displays and their adapters specify colors of a digital image being displayed according to a Red, Green, and Blue (RGB) scale. Digital images comprise a collection of picture elements or pixels arranged on a regular grid. Digital images can be defined as a gray scale image or a color image. A gray scale image is represented by a channel of specific brightness values at individual pixel locations. A color image pixel is represented by numerical RGB components that correspond to a particular color. These three RGB components are typically three 8-bit numbers for each pixel. Each 8 bit RGB component can have 256 possible values, ranging from 0 to 255 and the composite of the three RGB values creates the final color for that one pixel area. For example, a Black pixel has a RGB value of (0, 0, 0), meaning (Red=0, Green=0, Blue=0), a White pixel has a RGB value of (255, 255, 255), and an Orange pixel has a RGB value of (250, 165, 0). A Gray pixel has the property of having substantially equal values in RGB. For example, a pixel with a RGB value (220, 220, 220) is a light gray (near white), and a pixel with a RGB value (40, 40, 40) is a dark gray (near black). As such, there are approximately 256 shades of gray in a conventional gray-scale display.

The colors of the pixels in an image can also be represented using other values. One example is called "HSV". Under the HSV model, each color is represented by three values that express the hue, saturation, and value (HSV). The hue is defined as a particular position along a circular hue spectrum in which different colors are represented at different positions along a circle (See FIG. 4). The hue spectrum represents a full range of major hues in the following order: blue, magenta, red, yellow, green, and cyan. The saturation is the distance from gray which corresponds to the center of the circle, (e.g., the amount of the hue present). The value is the brightness of the color and brighter colors have higher values. Gray scale images contain only achromatic colors (i.e., images without a specific hue and with zero saturation).

Figure 1:
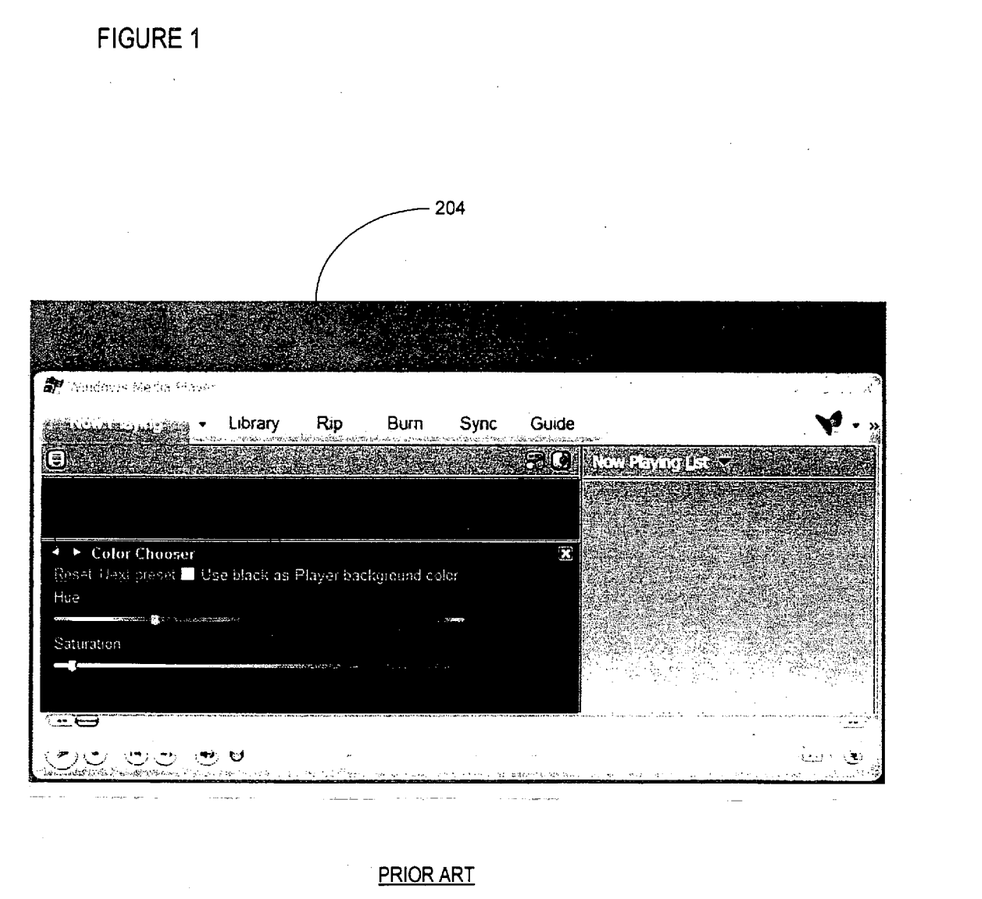
FIG. 1 is a screen shot of a user interface determined by conventional HSV to RGB conversion techniques.

In order to enhance a user's experience when viewing or using an application user interface (user interface), the user interface may include input controls that allow the user to customize various aspects of the interface's appearance. For example, the user interface may include slide bar controls or other mechanisms that allow the user to adjust hue and/or saturation levels of the user interface. As the user manipulates such controls, the color scheme of user interface is changed by modifying the hue offset and saturation scale of the pixels used to render the user interface. Previously, color adjustment of user interfaces was accomplished by transforming RGB values of pixels in the images into HSV values, adjusting the hue and saturation, and then transforming these adjusted values back to RGB values to generate the resultant image. This technique produces fairly good results when the saturation level is high and the color of the image is preserved. However, as the saturation is lowered and the colors become close to those of a grayscale image, the images lose contrast and appear to become "washed out." FIG. 1 is a screen shot of an exemplary user interface color-adjusted by conventional HSV to RGB conversion techniques. Images appear washed out because the human eye perceives different colors to have different relative brightness levels. For example, yellow appears brighter than blue even when the colors have the same mathematical brightness when expressed in RGB/HSV colors.

As a result there is a need for an improved system and method for adjusting colors in a digital image.

SUMMARY OF THE INVENTION

The invention meets the above needs and overcomes one or more deficiencies in the prior art by providing an improved user experience when selecting a color scheme of a user interface. More specifically, the invention provides a system that provides improved contrast and luminance even when the saturation level is low and the colors of the pixels forming the user interface are near or in grayscale. Moreover, the invention provides a system that provides improved color transformation of the user interface with minimal affects on processing speed. The invention is of particular use for an application user interface because a user interface does not require absolute accuracy of color representation, and processing speed is vitally important to the apparent responsiveness of the application. The invention provides results that are accurate enough to be pleasing visually, but that may sacrifice some accuracy of other complicated systems in order to gain processing speed. One skilled in the art would recognize that there may be other applications in which it is useful to trade accuracy for speed in a hue and saturation transform, and a user interface is simply one example.

In accordance with one aspect of the invention, one or more computer-readable media having computer-executable components for changing a color scheme of a user interface is provided. The user interface includes a plurality of pixels each having an input red, green, blue (RGB) value defining the color thereof. A first transform component converts the input RGB values of the pixels to corresponding hue and saturation values. A user interface component receives a user-specified change to the color scheme of the user interface. The user-specified change defines either a hue value offset, a saturation value scaling factor, or both. A second transform component adjusts the hue and saturation values of the pixels as a function of the user-specified change and converting the adjusted hue and saturation values of the pixels to output RGB values. The second transform component further weights the output RGB values if the defined saturation value scaling factor is less than a threshold saturation value scaling factor.

In accordance with another aspect of the invention, a method for adjusting a color scheme of a user interface is provided. The user interface includes a plurality of pixels each having an original red, green, blue (RGB) value defining the color of the pixel. The method includes receiving a user-specified change to the color scheme of the user interface. The user-specified change defines either a hue value offset, a saturation value scaling factor, or both. The method also includes first converting the original RGB values of the pixels to corresponding hue and saturation values. The method also includes adjusting the hue and saturation values of the pixels as a function of the user-specified change. The method further includes second converting the adjusted hue and saturation values of the pixels to output RGB values. The method also includes weighting the output RGB values if the defined saturation value scaling factor is less than the threshold saturation value. The method further includes assigning the weighted output RGB values to the pixels of the user interface.

In accordance with yet another aspect of the invention, a computer system having a graphical user interface provides a method for selecting and changing a color scheme of the graphical user interface. The user interface includes a plurality of pixels having input color values defining the colors of the pixels. The method includes receiving, at the user interface, a user-specified change to the color scheme of the user interface. The user-specified change defines either a hue value offset, a saturation value scaling factor, or both. The method also includes first converting the original color values to corresponding hue and saturation values, adjusting the hue and saturation values of original color values for the pixels of the user interface as a function of the user-specified change, and second converting the adjusted hue and saturation values of the pixels to output color values. The method also includes comparing the saturation value scaling factor defined by the user-specified change to a threshold saturation value scaling factor and weighting the output color values when the defined saturation value scaling factor is less than a threshold saturation value scaling factor. The method further includes assigning weighted output color values to the pixels of the user interface.

Alternatively, the invention may comprise various other methods and apparatuses.

Other features will be in part apparent and in part pointed out hereinafter.

BRIEF DESCRIPTION OF THE DRAWINGS

The patent or application file contains at least one drawing executed in color. Copies of this patent or patent application publication with color drawings will be provided by the Office upon request and payment of the necessary fee.

Corresponding reference characters indicate corresponding parts throughout the drawings.

DETAILED DESCRIPTION OF THE INVENTION

Figure 2A:
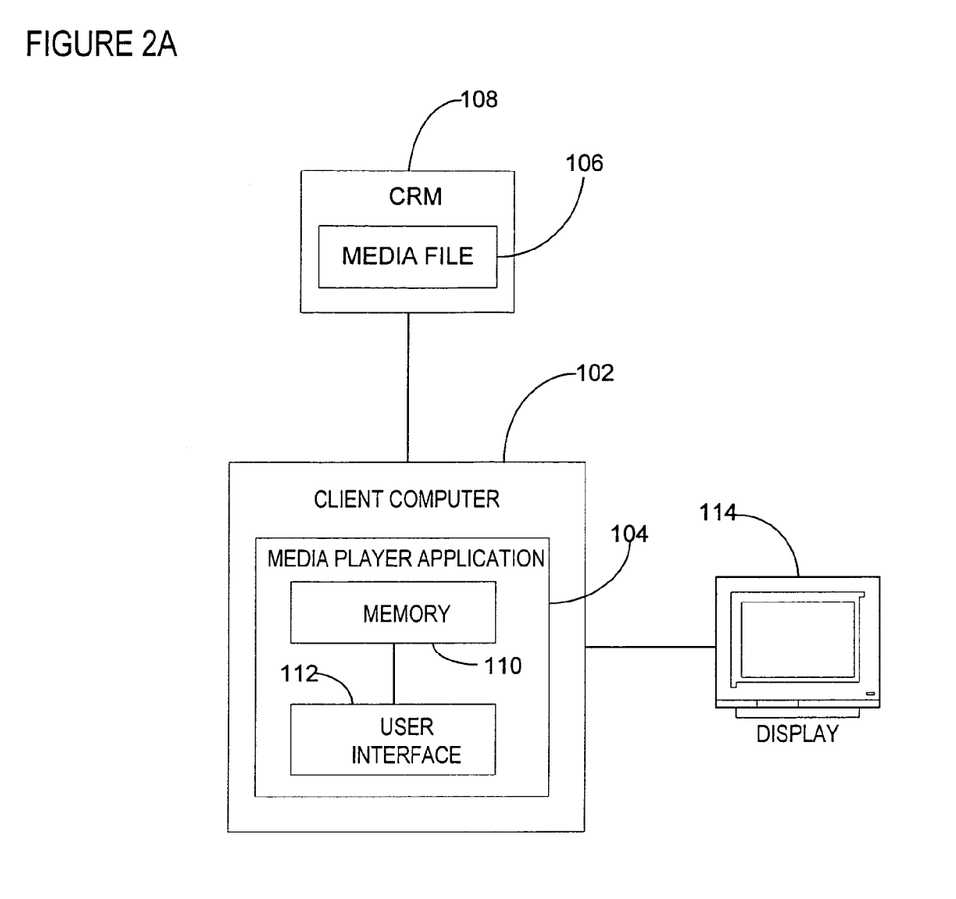
FIG. 2A is an exemplary computer system in which the present invention can be used.

Referring to the drawings, FIG. 2A illustrates an exemplary computer system 101 in which the present invention can be used. System 101 includes a client computer 102 that executes a media player application (MPA) 104. The media player application 104 can be any suitable rendering filter or program configured to play digital media so that a user can experience the content embodied on the media. For example, suitable MPA 104 includes a CD media player application, a digitally-compressed-file player application, and/or a DVD media player application. Executing the MPA 104, allows the user to access a digital media file 106 on a computer-readable medium (CRM) 108 such as a compact disc, a network server, or any other suitable computer storage media. The MPA 104 includes a graphical user interface 112 that enables the user or, particularly, enables MPA 104 to access, retrieve, store, and display for the user, so-called metadata. Those skilled in the art are familiar with metadata, which is simply information about data.

In the context of the present invention, the user interface 112 also enables the user to change the appearance of the graphical user interface itself. For example, the user can change the appearance of the user interface 112 by applying a skin. The skin is a customized graphic or user interface created by the user, or another, to replace a computer program's default interface. Each skin has a distinct appearance and most skins incorporate basic functions such as play, previous, next, stop, and the ability to adjust the volume. In fact, some skins offer added functionality such as the ability to adjust colors of the skin applied to player while playing a media file and/or viewing corresponding album art, and other visualizations or custom features. In this case, the user interface 112 allows the user to adjust the appearance of the user interface 112 by selectively defining hue and saturation values that are used to determine new RGB values for pixels forming the interface.

The system 101 allows improved management of the appearance of a user interface 112 being viewed on the display 114 of the client computer 102 executing MPA 104 by producing improved contrast and luminance even when the saturation level is low and colors in the interface are close to grayscale. More specifically, the present invention provides an improved conversion technique for transforming HSV to RGB values to produce acceptable color output with low computational complexity.

Figure 2B:
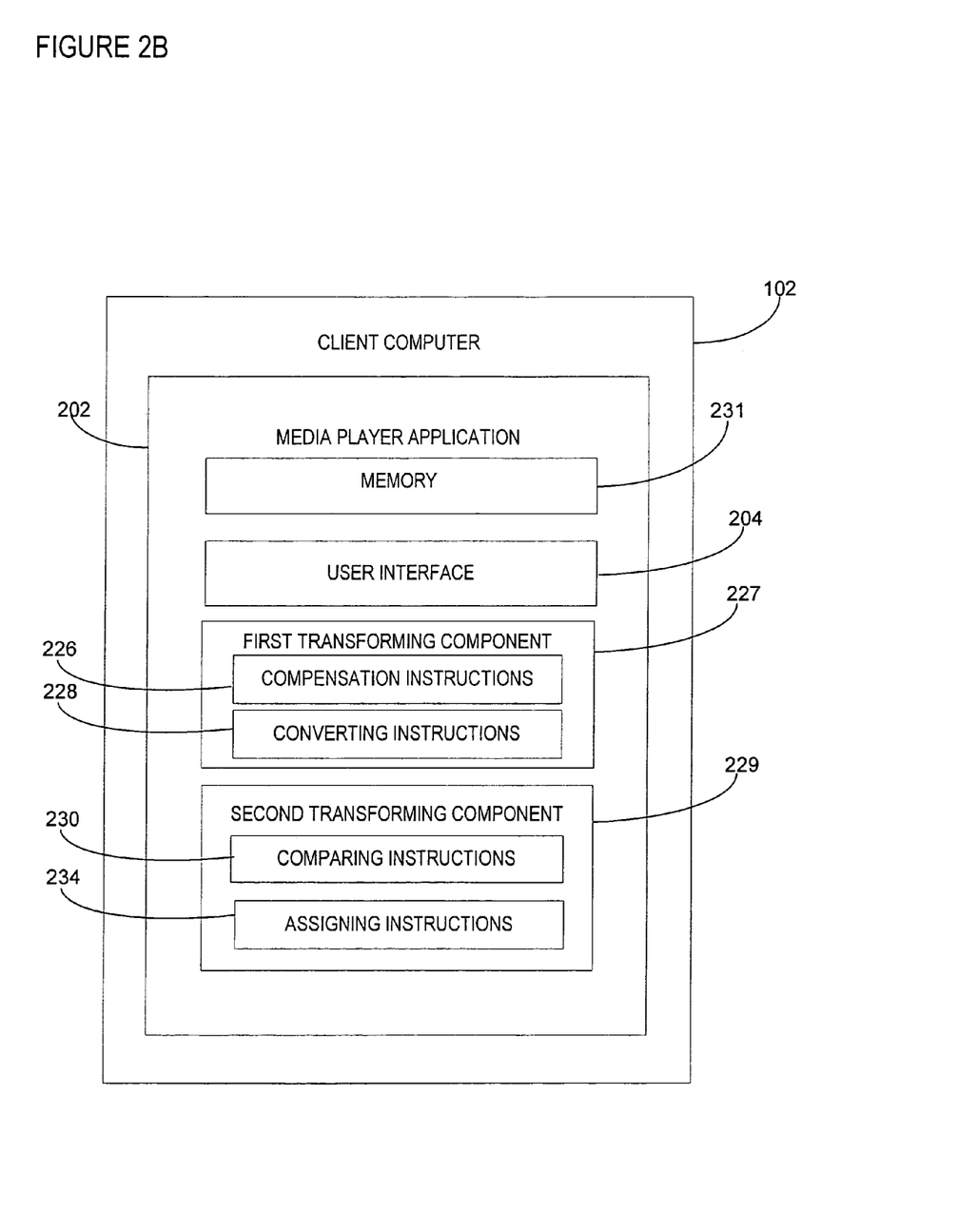
FIG. 2B is an exemplary block diagram illustrating components of a media player application according to one embodiment of the invention.
Figure 3:
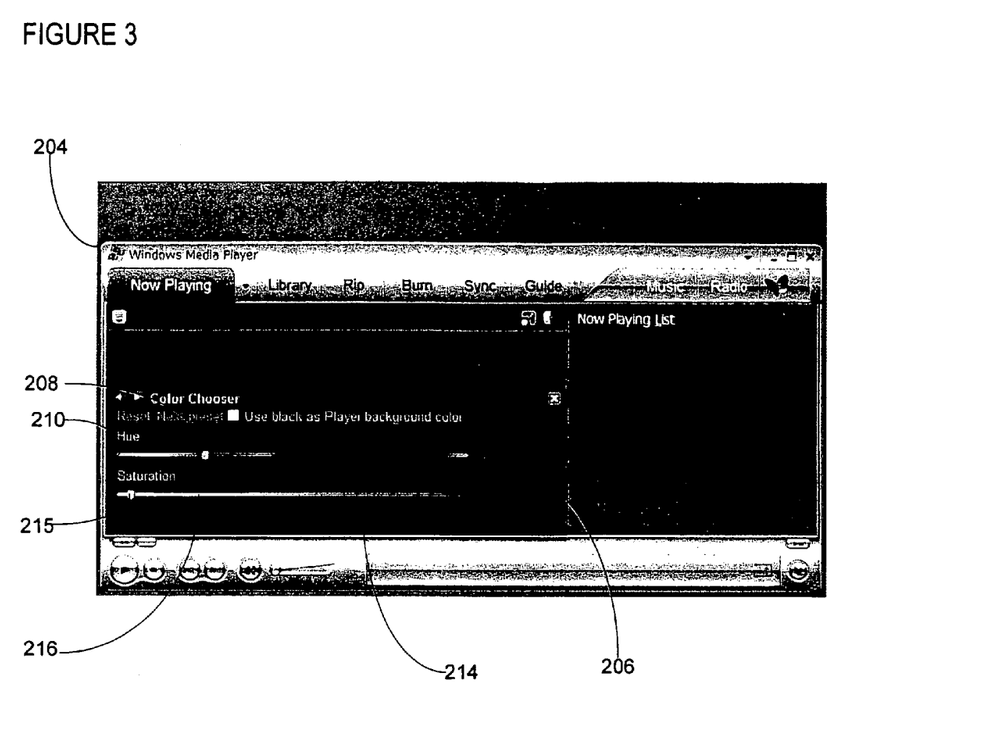
FIG. 3 illustrates an exemplary user interface according to one embodiment of the invention.

Referring now to FIG. 2B, an exemplary block diagram illustrates basic components of a media player application 202 (e.g., MPA 104) having computer executable instructions for adjusting a color scheme of a user interface 204. A user interface 204 allows the user to define saturation and hue values that are used to convert the original (or input) RBG values of pixels forming the interface to new (or output) RGB values, and, thus adjust the appearance of the user interface 204. Referring now to FIG. 3, a screen shot illustrates an exemplary view of a user interface 204 that allows a user to change the color of the user interface 204. A hue slider control 206 allows a user to selectively adjust the color of the pixels forming the particular skin or interface across a range of hues (e.g., blue, magenta, red, yellow, green, and cyan). More specifically, the user positions a hue slider button 208 along the hue slider scale 210 to offset the hue (i.e., color) of the pixels forming the user interface 204. A saturation slider control 214 allows the user to select the saturation level of the pixels forming the user interface 212. More specifically, by moving a saturation slider button 215 along the slider scale 216 to the user defines a saturation scaling factor that is used to adjust the intensity of the selected hue (i.e., color) of pixels forming the user interface 204. For example, moving the saturation slider button 214 to the left along the slider scale 216 decreases the intensity of the selected hue, and moving the saturation slider button to the right along the scale. When the saturation slider button 214 is positioned to the far left end of the slider scale 216, the saturation value has a minimum value (e.g., 0) and pixels forming the user interface will be in grayscale. On the other hand, when the saturation slider button 214 is positioned to the far right end of the slider scale 216, the saturation value has maximum value (e.g., 3.5) and pixels forming the user interface will be in full color.

Figure 4:
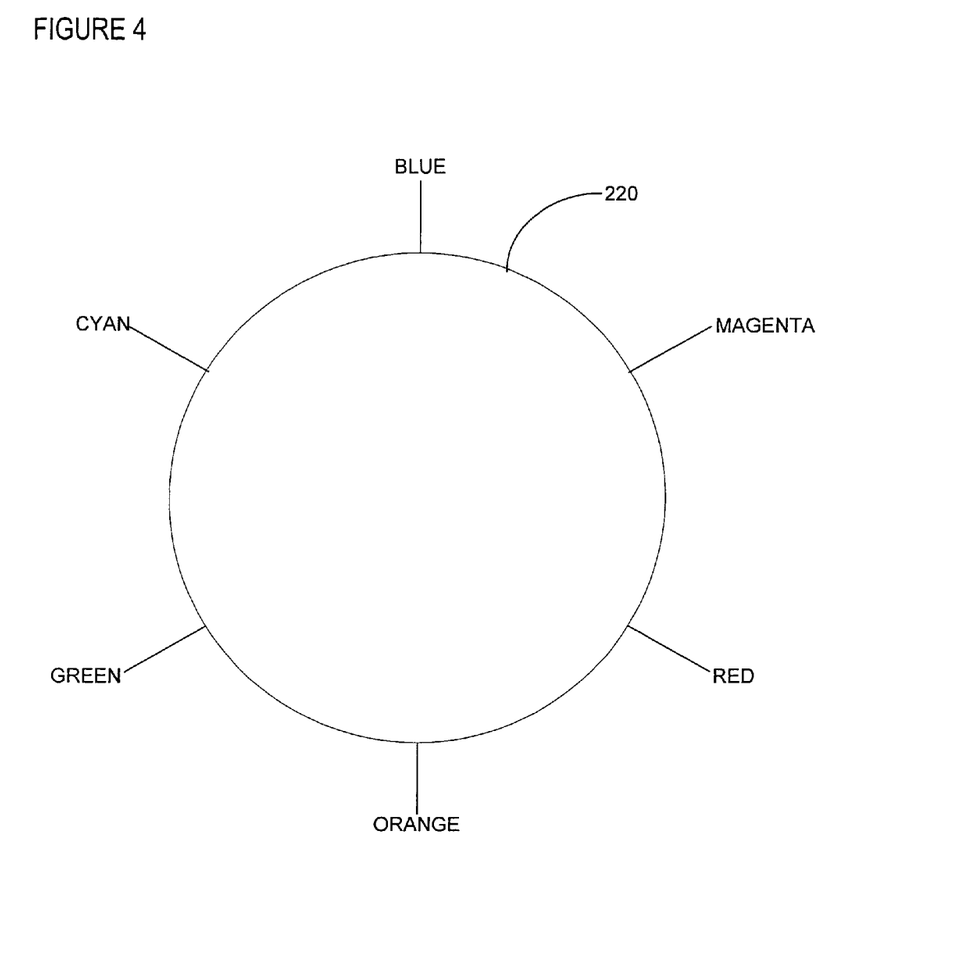
FIG. 4 illustrates a circular hue spectrum.

Conceptually, the user interface 204 makes use of a continuous, circular hue spectrum 220 such as illustrated in FIG. 4, in which different hues are represented at different positions along the circle 220. The hue spectrum represents a full range of major hues in the following order: blue, magenta, red, yellow, green, and cyan. These major hues repeat themselves as the circle 220 is repeated. The major hues are spaced at regular, equal intervals, referred to as hue intervals. For example, hue intervals are space approximately every 60 degrees around the hue spectrum. Each position along the circle is assigned a numerical value, starting with zero at the top, proceeding to 120 at the bottom, and then to 240 back at the top. The top position can be considered to be equal to either zero, 240, or −240. The major hues are thus separated from each other numerically by intervals of forty. Blue has values of zero, 240, or −240; magenta has values of 40 or −200; red has values of 80 or −160; yellow has values of 120 or −120; green has values of 160 or −80; and cyan has values of 200 or −40. The range of hues is considered to be continuous across the top of the circle, so that the numerical difference between cyan and magenta is 80. Each position along the hue slider corresponds to a particular position along the circular hue spectrum 80. For example, the center of the hue slider scale 216 corresponds to the top of circular hue spectrum, which is blue. As another example, the left end and the right end of the slider scale 216 each correspond to the bottom of the circular hue spectrum 220, which is orange.

Referring back to FIG. 2B, after a hue offset and a saturation scaling factor value are defined by the user, the MPA 202 executes compensation instructions 226 included in a first transforming component 227 to weight each of the RGB values to compensate for the way the human eye perceives the brightness of different colors. As explained above, the human eye may perceive one particular color to be brighter than another color even when the colors have the same mathematical brightness. In this particular embodiment, the compensation instructions 226 use the following equations to determine a weighted value for each of the RGB values:

$$R_W = (0.3086 * R_O); \quad (1)$$

$$G_W = (0.6094 * G_O); \quad (2)$$

$$B_W = (0.0820 * B_O); \quad (3)$$

where $R_O$ is the input red value of a pixel in the interface and 0.3086 is the relative human perception of the color red, $G_O$ is the input green value of the same pixel in the interface and 0.6094 is the relative human perception of the color green, and $B_O$ is the input blue value of the same pixel in the interface and 0.0820 is the relative human perception of the color blue. Compensation instructions 226 also calculate an original luminance value (OLV) as a function of the weighted RGB values using the following algorithm:

$$OLV = R_W + G_W + B_W. \quad (4)$$

By combining equations (1), (2), and (3), the following equation can be derived and used to the OLV:

$$OLV = (0.3086 * R_W) + (0.6094 * G_W) + (0.0820 * B_W). \quad (5)$$

The first transforming component 227 then executes converting instructions 228 to convert the input RGB values to $R_{HSV} G_{HSV} B_{HSV}$ values based on the defined hue offset and saturation scaling factor values. For example, the first transforming component 227 executes a standard RGB to HSV to RGB algorithm or code, such as described in "Graphics Gems" by Andrew S. Glassner, (Academic Press, 1998), to determine the $R_{HSV} G_{HSV} B_{HSV}$. Such an algorithm first converts the original RGB values of the pixels in the interface to HSV values. The HSV values are adjusted by changing the original hue value by the hue offset value as defined by the hue slider control 206 and by changing the original saturation value by the saturation scaling factor value as defined by the saturation slider control 214. The modified HSV is then converted back to output RGB values. These output RGB values are referred herein as $R_{HSV} G_{HSV} B_{HSV}$ values.

After MPA 202 calculates $R_{HSV} G_{HSV} B_{HSV}$ values, it executes second transforming component 229 in one embodiment to determine if further weighting of the RGB values is required. For example, the second component includes comparing instructions 230 for comparing the defined saturation value to a threshold value stored in the memory 231 to determine if the $R_{HSV} G_{HSV} B_{HSV}$ values should be converted grayscale RGB values. These grayscale RGB values are hereafter referred to as $R_{GS} G_{GS} B_{GS}$ values. If the defined saturation value is the less than the threshold saturation value, the second transforming component 229 calculates weighted output $R_{GS} G_{GS} B_{GS}$ values for pixels forming the user interface 204. In particular, when the saturation scaling factor is reduced below a specified saturation threshold (e.g., 1) stored in a memory of the MPA, the transforming component 229 executes the following algorithm to determine each of the weighted output values $R_{GS} G_{GS} B_{GS}$ for pixels in the interface 204:

$$R_{GS} = (SV * R_{HSV}) + (1.0 - SV) * OLV; \quad (6)$$

$$G_{GS} = (SV * G_{HSV}) + (1.0 - SV) * OLV; \quad (7)$$

$$B_{GS} = (SV * B_{HSV}) + (1.0 - SV) * OLV; \quad (8)$$

where SV is the defined saturation value, and $R_{HSV}, G_{HSV}, B_{HSV}$ are determined from the standard RGB to HSV to RGB algorithm.

The result from the transforming component 229 is then passed to the assigning component which executes assigning instructions 234 to assign the weighted output values $R_{GS}, G_{GS}$, and $B_{GS}$ to the pixels of all the various buttons, and other controls forming the user interface when the defined saturation value is the less than the threshold saturation value. As a result, the user interface 204 has improved contrast and luminance when the defined saturation value is low (i.e., below the threshold saturation value) and the colors in the interface are in grayscale. Alternatively, the assigning instructions 234 assign the $R_{HSV} G_{HSV} B_{HSV}$ to the pixels of all the various buttons, and other controls forming the user interface when the defined saturation value is equal to or greater than the threshold saturation value.

Accordingly, if the user adjusts the saturation slider button 214 to a position corresponding to value below the threshold value, the MPA 202 executes the first and second calculating instructions 232 to determine a new color of the pixels of all the various buttons and other controls that make up the user interface. Alternatively, if the user adjusts the saturation slider button 214 to position corresponding to value equal to or above the threshold value, the MPA 202 only executes the first calculating instructions to determine the color of the pixels of the various buttons and other controls in the interface.

Figure 5:
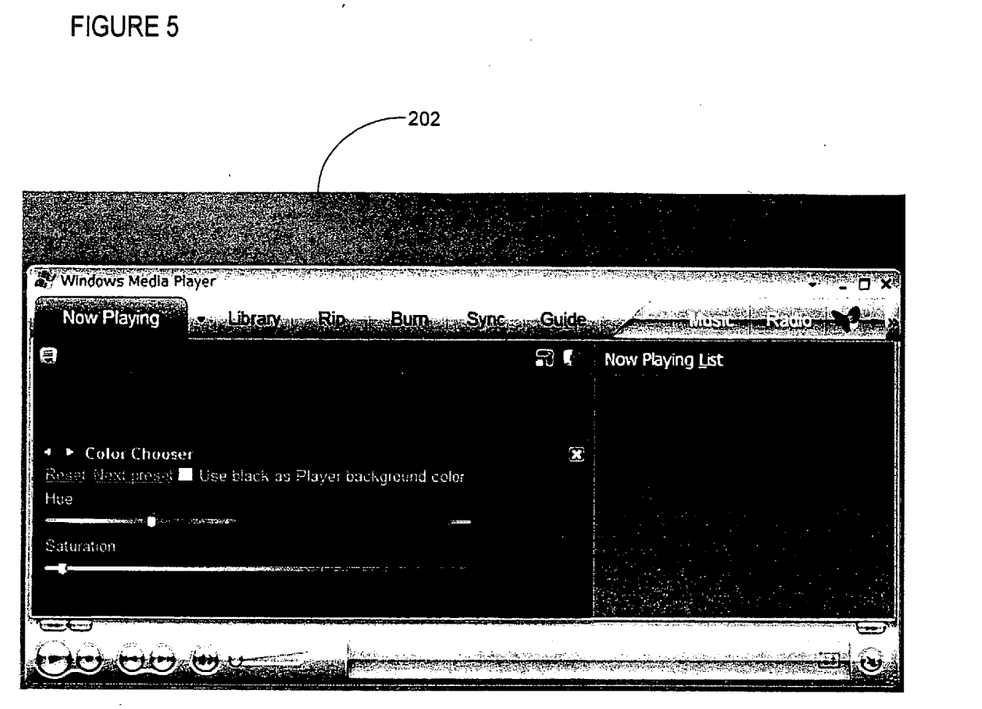
FIG. 5 is a screen shot of a user interface determined according to one embodiment of the invention.

FIG. 5 illustrates the benefits of assigning the $R_{GS}$, $G_{GS}$, and $B_{GS}$ output values to pixels forming the user interface rather than assigning the $R_{HSV}$ $G_{HSV}$ $B_{HSV}$ output values when the defined saturation value is low. As described above, FIG. 1 is a screen shot of a user interface 204 formed by pixels having RGB values determined by the first calculating instructions 228 (e.g., standard RGB to HSV to RGB algorithm) when the saturation is below the specified threshold. FIG. 5 is a screen shot of a user interface 204 formed by pixels having RGB values as determined by the second calculating instructions when the saturation is below the specified threshold. As can be seen the user interface 204 shown in FIG. 1 appears washed out and has less contrast than user interface 204 illustrated in FIG. 5.

Figure 6:
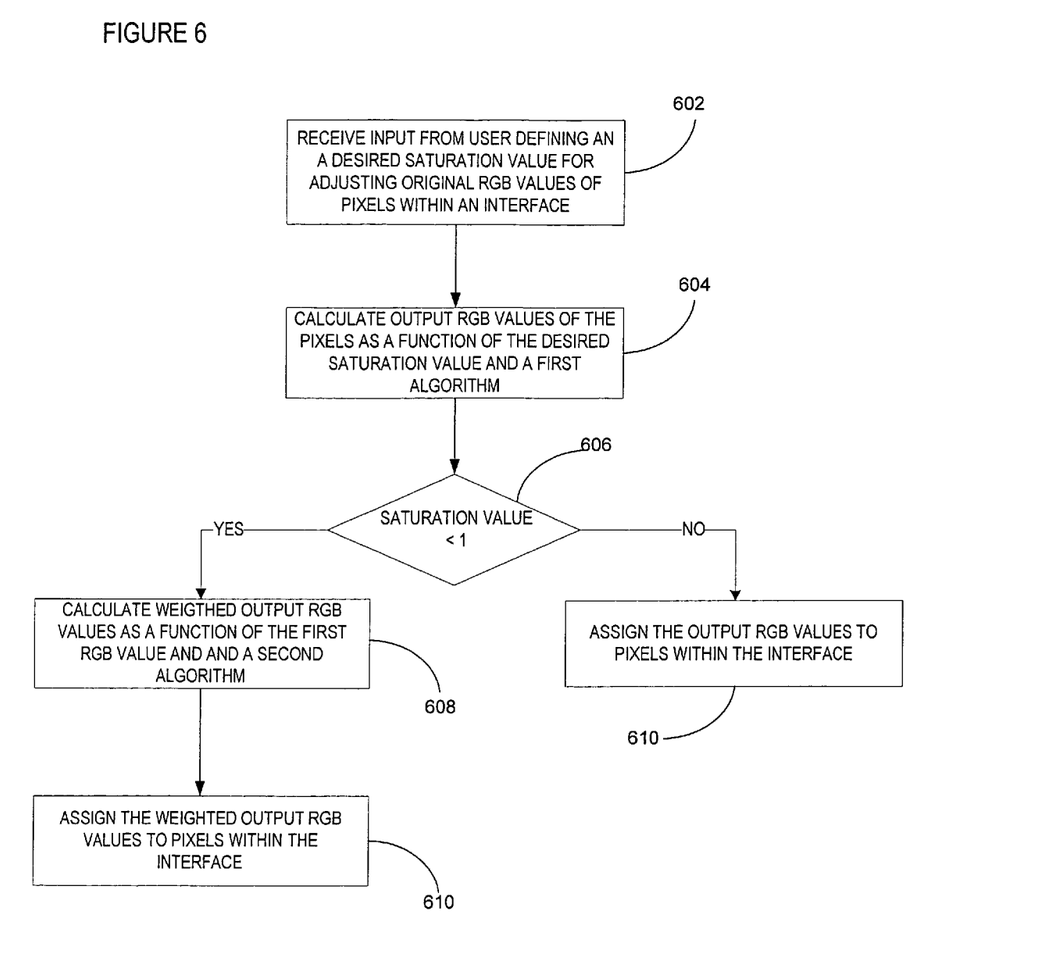
FIG. 6 is an exemplary flow chart illustrating a method of adjusting the color of a user interface according to one embodiment of the invention.

Referring now to FIG. 6, an exemplary flow chart illustrates a method of adjusting the color scheme of a user interface 204 according to the embodiment shown in FIG. 5. At 602, a MPA 202 receives input from a user defining a desired hue offset value and a desired saturation scaling factor value that are used to adjust an original RGB value of pixels forming the user interface 204. The MPA 202 calculates output RGB values (e.g., $R_{HSV}$ $G_{HSV}$ $B_{HSV}$) based on the defined hue offset a saturation scaling factor values at 604. For example, the MPA 202 executes a standard RGB to HSV to RGB algorithm to determine the first output RGB values. At 606, the MPA 202 determines if the desired saturation value is less than a threshold value stored in memory 231. If the MPA 202 determines that the desired saturation value is not less than the threshold value at 606, the MPA 202 applies the output RGB values to the pixels forming the user interface at 608. If the MPA 202 determines that the desired saturation value is less than the threshold value at 606, the MPA calculates weighted output RGB values (i.e., $R_{GS}$ $G_{GS}$ $B_{GS}$) to assign to the pixels forming the user interface 204 at 610.

Figure 7:
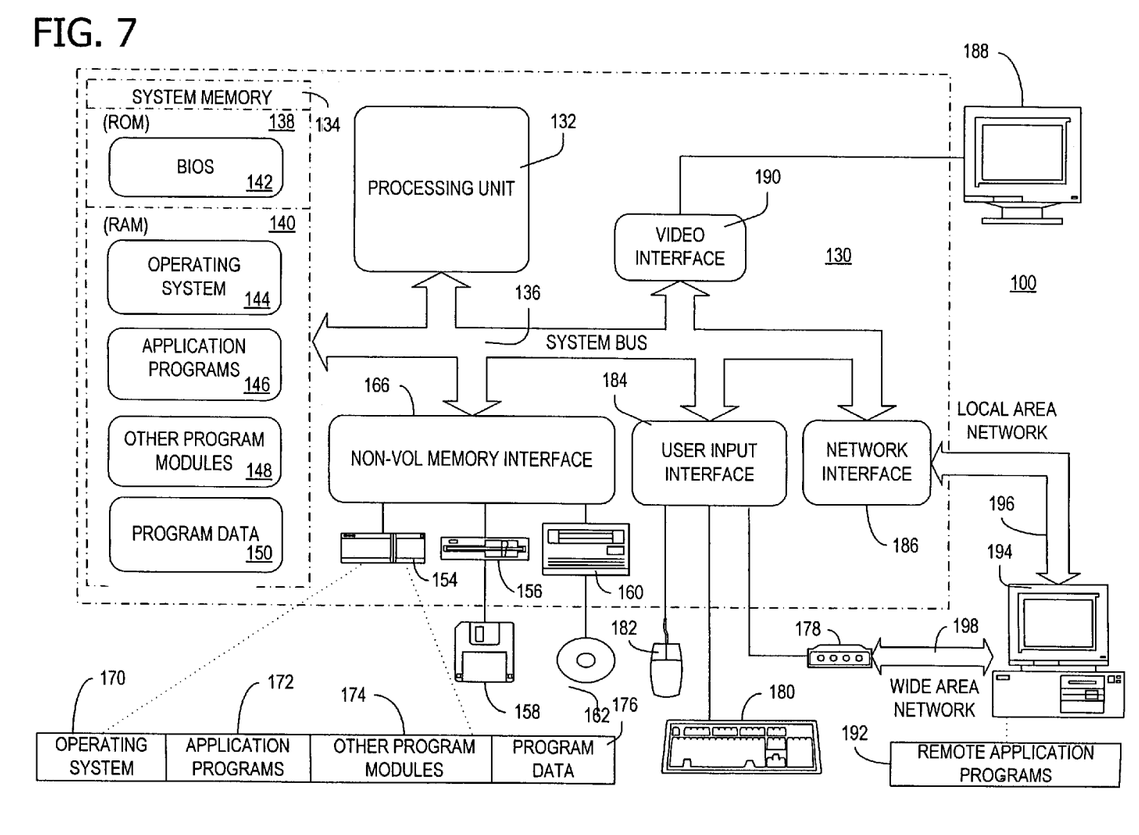
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures; program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182

(e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide-area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 6 to transfer graphical information from a client computer to a portable media device or remote computer.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objectives of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. One or more computer-readable media having computer-executable components for changing a color scheme of a user interface, said user interface including a plurality of pixels, said pixels each having an input red, green, blue (RGB) value defining the color thereof, said components comprising:
   a first transform component for converting the input RGB values of the pixels to corresponding hue and saturation values;
   a user interface component for receiving a user-specified change to the color scheme of the user interface, said user-specified change defining either a hue value offset, a saturation value scaling factor, or both; and
   a second transform component for adjusting the hue and saturation values of the pixels as a function of the user-specified change and converting the adjusted hue and saturation values of the pixels to output RGB values, said second transform component further weighting the output RGB values if the defined saturation value scaling factor is less than a threshold saturation value scaling factor.

2. The computer-readable media of claim 1 wherein each of the plurality of pixels is assigned the output RGB values when the second transform component indicates that the defined saturation value scaling factor is greater than or equal to the threshold saturation value scaling factor.

3. The computer-readable media of claim 1 wherein the first transform component comprises compensation instructions for determining weighted input RGB values by multiplying each of the input RGB values by a corresponding compensation factor, said weighted input RGB values compensating for visual differences associated with each of the RGB values as perceived by a human eye, and wherein the first transform component executes converting instructions to convert the weighted input RGB values to the corresponding hue and saturation values.

4. The computer-readable media of claim 3 wherein the compensation instructions execute the following algorithms to determine components of the weighted input RGB values for each of the input RGB values:

$$R_W = (0.3086 * R_O),$$

$$G_W = (0.6094 * G_O),$$

$$B_W = (0.0820 * B_O),$$

where $R_O$ is the first red value of a pixel in the user interface, $G_O$ is the first green value of pixels in the user interface, and $B_O$ is the first blue value of a pixel in the user interface.

5. The computer-readable media of claim 3 wherein the compensation instructions include instructions for calculating an original luminance value (OLV), and wherein the second transform component calculates the weighted output RGB values as a function of the weighted input RGB values and the original luminance value when the defined saturation value scaling factor is less than the threshold saturation value scaling factor.

6. The computer-readable media of claim 5 wherein the compensation instructions execute the following algorithm to determine the original luminance value:

$$OLV = R_W + G_W + B_W;$$

where $R_W$, $G_W$, and $B_W$ are components of the weighted input RGB values.

7. The computer-readable media of claim 6 wherein the second transform component executes the following algorithms to determine the weighted output RGB values to assign to each of the plurality of pixels in the user interface when the defined saturation value scaling factor is less than the threshold saturation value scaling factor:

$$R_{OUT} = (SV * R_{HSV}) + (1.0 - SV) * OLV;$$

$$G_{OUT} = (SV * G_{HSV}) + (1.0 - SV) * OLV;$$

$$B_{OUT} = (SV * B_{HSV}) + (1.0 - SV) * OLV; \text{ and}$$

where SV is the defined saturation value scaling factor, $R_{HSV}$, $G_{HSV}$, and $B_{HSV}$ are components of the output RGB values converted from the adjusted hue and saturation values by the second transform component, and OLV is the original luminance value.

8. The computer-readable media of claim 1 wherein the user interface component includes saturation slider control for defining the saturation value scaling factor and a hue slider control for defining the hue value offset for each of the plurality of pixels.

9. The computer-readable media of claim 1 wherein the threshold saturation value scaling factor is 1.0.

10. A method for adjusting a color scheme of a user interface, said user interface including a plurality of pixels, said pixels each having an original red, green, blue (RGB) value defining the color of the pixel, comprising:
    receiving a user-specified change to the color scheme of the user interface, said user-specified change defining either a hue value offset, a saturation value scaling factor, or both;
    first converting the original RGB values of the pixels to corresponding hue and saturation values;
    adjusting the hue and saturation values of the pixels as a function of the user-specified change;
    second converting the adjusted hue and saturation values of the pixels to output RGB values;
    weighting the output RGB values if the defined saturation value scaling factor is less than the threshold saturation value; and
    assigning the weighted output RGB values to the pixels of the user interface.

11. The method of claim 10 further comprising assigning the output RGB values without weighting to the pixels of the user interface if the defined saturation scaling factor value is greater than or equal to the threshold saturation value scaling factor.

12. The method of claim 10 wherein first converting the original RGB values includes multiplying each of the original RGB values by a predetermined compensation factor to determine weighted original RGB values, said weighted original RGB values compensating for a visual difference between each of the RGB values as perceived by a human eye, and wherein first converting the original RGB values includes converting the weighted original RGB values to the corresponding hue and saturation values.

13. The method of claim 12 further comprising determining an original luminance value as a function of the weighted original RGB values, wherein weighting the output RGB values includes determining the weighted output RGB values as a function of the determined original luminance value and the weighted original RGB values when the defined saturation value scaling factor is less than the threshold saturation value scaling factor.

14. The method of claim 10 wherein the threshold saturation value scaling factor is 1.0.

15. In a computer system having a graphical user interface for changing a color scheme of the graphical user interface, said user interface including a plurality of pixels having input color values defining the colors of the pixels, a method of selecting and changing the color scheme of the user interface comprising:
  receiving, at the user interface, a user-specified change to the color scheme of the user interface, said user-specified change defining either a hue value offset, a saturation value scaling factor, or both;
  first converting the original color values to corresponding hue and saturation values;
  adjusting the hue and saturation values of original color values for the pixels of the user interface as a function of the user-specified change;
  second converting the adjusted hue and saturation values of the pixels to output color values;
  comparing the saturation value scaling factor defined by the user-specified change to a threshold saturation value scaling factor;
  weighting the output color values when the defined saturation value scaling factor is less than a threshold saturation value scaling factor; and
  assigning weighted output color values to the pixels of the user interface.

16. The method of claim 15 further comprising assigning each of the plurality of pixels the output color values without weighting when the defined saturation value is greater than or equal to the threshold saturation value scaling factor.

17. The method of claim 15 wherein the first converting includes multiplying each of the original color values by a predetermined compensation factor to determine weighted original color values, said weighted original color values compensating for a visual difference between each of the color values as perceived by a human eye, and wherein first converting the original color values includes converting the weighted original color values to the corresponding hue and saturation values.

18. The method of claim 17 further comprising determining an original luminance value (OLV) as a function of the weighted original color values, wherein weighting the output color values includes weighting the output color values as a function of the determined original luminance value and the weighted original color values when the defined saturation value scaling factor is less than the threshold saturation value scaling factor.

19. The method of claim 18 wherein determining the original luminance value includes executing the following algorithm:

$$OLV = R_W + G_W + B_W;$$

where $R_W$, $G_W$, and $B_W$ are components of the weighted input RGB values.

20. The method of claim 19, wherein the output colors correspond to red, green, and blue output values ($R_{OUT}$, $G_{OUT}$, $B_{OUT}$) for each of the plurality of pixels, and wherein weighting includes executing the following algorithm to determine the output color values to assign to each of the plurality of pixels in the user interface when the defined saturation value scaling factor is less than the threshold saturation value scaling factor:

$$R_{OUT} = (SV * R_{HSV}) + (1.0 - SV) * OLV;$$

$$G_{OUT} = (SV * G_{HSV}) + (1.0 - SV) * OLV;$$

$$B_{OUT} = (SV * B_{HSV}) + (1.0 - SV) * OLV; \text{ and}$$

where SV is the defined saturation value scaling factor, $R_{HSV}$, $G_{HSV}$, and $B_{HSV}$ are components of the output RGB values converted from the adjusted hue and saturation values by the second transform component, and OLV is the original luminance value.

* * * * *